(12) United States Patent
Risso

(10) Patent No.: US 8,135,260 B1
(45) Date of Patent: Mar. 13, 2012

(54) VIDEO GENERATION SYSTEM

(76) Inventor: Marcus Risso, Los Angeles, CA (US)

( * ) Notice: Subject to any disclaimer, the term of this patent is extended or adjusted under 35 U.S.C. 154(b) by 313 days.

(21) Appl. No.: 12/631,568

(22) Filed: Dec. 4, 2009

Related U.S. Application Data

(60) Provisional application No. 61/120,114, filed on Dec. 5, 2008.

(51) Int. Cl.
*H04N 5/93* (2006.01)
*G11B 27/00* (2006.01)

(52) U.S. Cl. ........................ 386/278; 386/287
(58) Field of Classification Search .......... 386/223–224, 386/278–287
See application file for complete search history.

(56) References Cited

U.S. PATENT DOCUMENTS

| 7,324,166 | B1 * | 1/2008 | Joslin et al. | 348/722 |
| 7,528,890 | B2 * | 5/2009 | Staker et al. | 348/592 |
| 2008/0291269 | A1 * | 11/2008 | Hong et al. | 348/51 |

* cited by examiner

*Primary Examiner* — Thai Tran
*Assistant Examiner* — Nigar Chowdhury
(74) *Attorney, Agent, or Firm* — Risso & Associates; Marcus Risso

(57) ABSTRACT

Described is a video generation system that allows a user to be filmed and merged into a premade video sequence. The system is configured to receive a video having a plurality of characters, each character having a corresponding audio track. A user can remove one of characters and corresponding audio track from the video, leaving remaining characters and remaining audio track. The video with the remaining characters and remaining audio track is then played on a display. Using a sensor and microphone, a user video image and corresponding user audio track is received. The user video image and user audio track is recorded as it is received while the video with remaining characters and corresponding audio track is played on the display. Thus, once merged, the user video image and user audio track can be played along with the video with the remaining characters and the remaining audio track.

9 Claims, 14 Drawing Sheets

VIDEO GENERATION SYSTEM

PRIORITY CLAIM

This is a Non-Provisional Utility Application of U.S. Provisional Application No. 61/120,114, filed on Dec. 5, 2008, and entitled, "Video Generation System."

FIELD OF INVENTION

The present invention relates to a video generation system and, more particularly, to a system that allows a user selectively remove a character from a premade video sequence and be filmed and merged into the premade video sequence in place of the removed character.

BACKGROUND OF INVENTION

Children have long been fascinated with videos and, particularly, cartoons. As children grow up, they quickly become engrossed in cartoons and the various cartoon characters. When available on video, children often spend hours watching and mimicking their favorite cartoon character. While such cartoon videos are entertaining and often educational, they do not provide an interactive element that expands the child's creativity. For example, although the children may sometimes mimic a particular character, the video itself does nothing to encourage and capture those moments.

Thus, a continuing need exists for a system that allows a user to be filmed and inserted into a favorite video, thereby allowing the user to increase creativity by acting along with a character and creating a customized video.

SUMMARY OF INVENTION

The present invention relates to a system, method, and computer program product for allowing a user to be filmed and merged into a premade video sequence for display upon a display system. The system includes one or more processors that are configured to receive a video having a plurality of characters, each character having a corresponding audio track. A user can remove one of the characters and corresponding audio track from the video, leaving remaining characters and remaining audio track. The video with the remaining characters and remaining audio track is then played on a display. Using a sensor and microphone, a user video image and corresponding user audio track is received. The user video image and user audio track is recorded as it is received while the video with remaining characters and corresponding audio track is played on the display. Thus, once merged, the user video image and user audio track can be played along with the video with the remaining characters and the remaining audio track.

In another aspect, the system is configured to perform an operation of displaying a translucent image of a removed character while playing the video with remaining characters and remaining audio track on the display system.

The method is a computer implemented method for causing a processor to perform said operations, while the computer program product includes instruction means for causing the processor to perform the operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
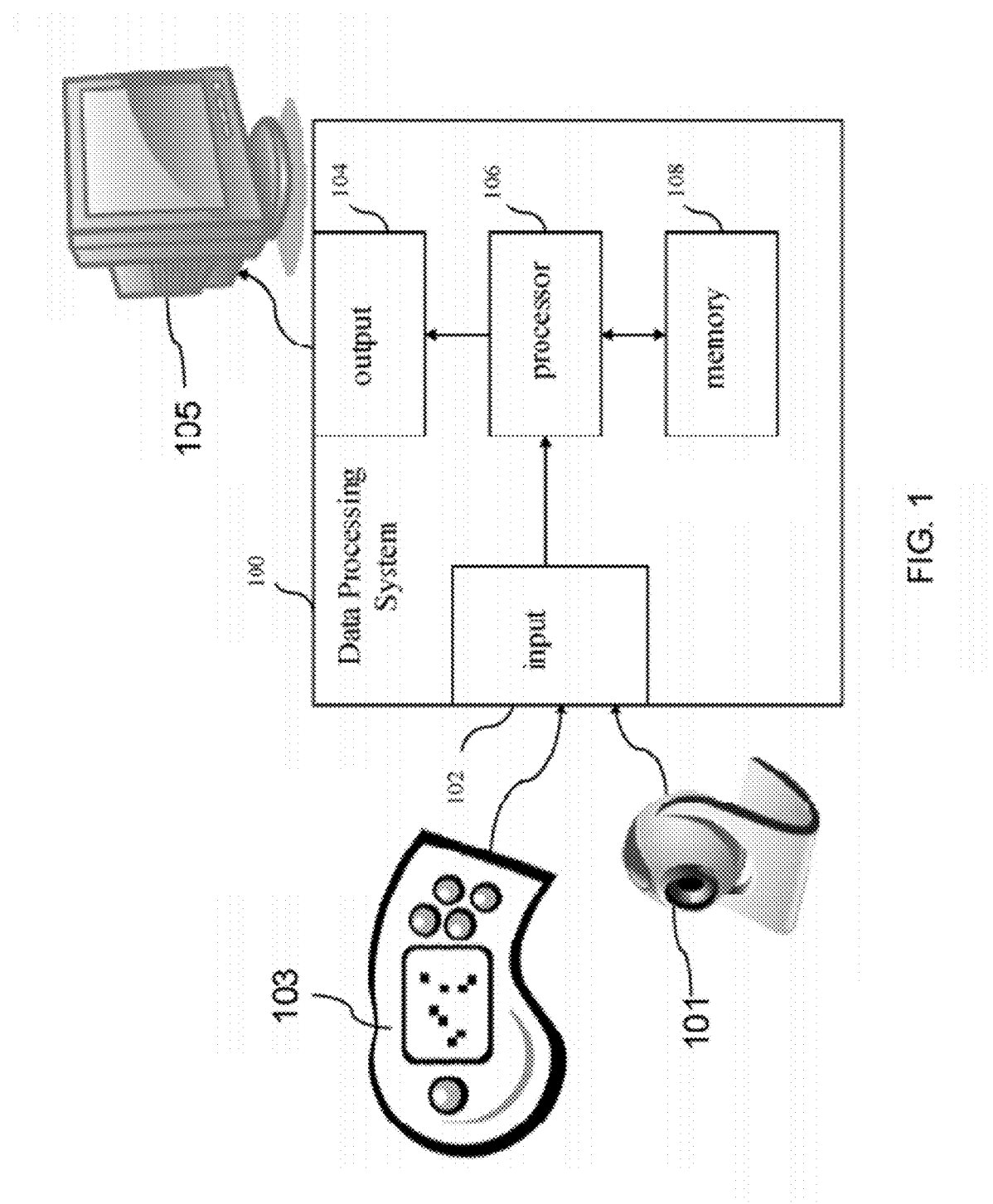
FIG. 1 is a block diagram depicting the components of a video generation system of the present invention.

The present invention relates to a video generation system and, more particularly, to a system that allows a user selectively remove a character from a premade video sequence and be filmed and merged into the premade video sequence in place of the removed character. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is provided. Next, a description of various principal aspects of the present invention is provided. Subsequently, an introduction provides the reader with a general understanding of the present invention. Finally, details of the present invention are provided to give an understanding of the specific aspects.

(1) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Chroma Key—The term "chroma key" generally refers to an electronic special-effects system for combining a desired background with live foreground action. Chroma key is a technique for mixing two images together, in which a color (or a small color range) from one image is removed (or made transparent), revealing another image behind it. This technique is also referred to as color keying, color-separation overlay, green screen, and blue screen.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

(2) Principal Aspects

The present invention has three "principal" aspects. The first is a video generation system. The video generation system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of a video generation system of the present invention is provided in FIG. 1. The video generation system includes a console 100 with an input 102 for receiving information from at least sensor 101 and possibly a controller 103. Note that the input 102 may include multiple "ports." Typically, input is received from at least one sensor, non-limiting examples of which include video image sensors (e.g., video camera) and a microphone. An output 104 is connected with the processor for providing information regarding user in the scene to other systems in order that a network of computer systems may serve as a video generation system. Output may also be provided to other devices (display monitor 105) or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
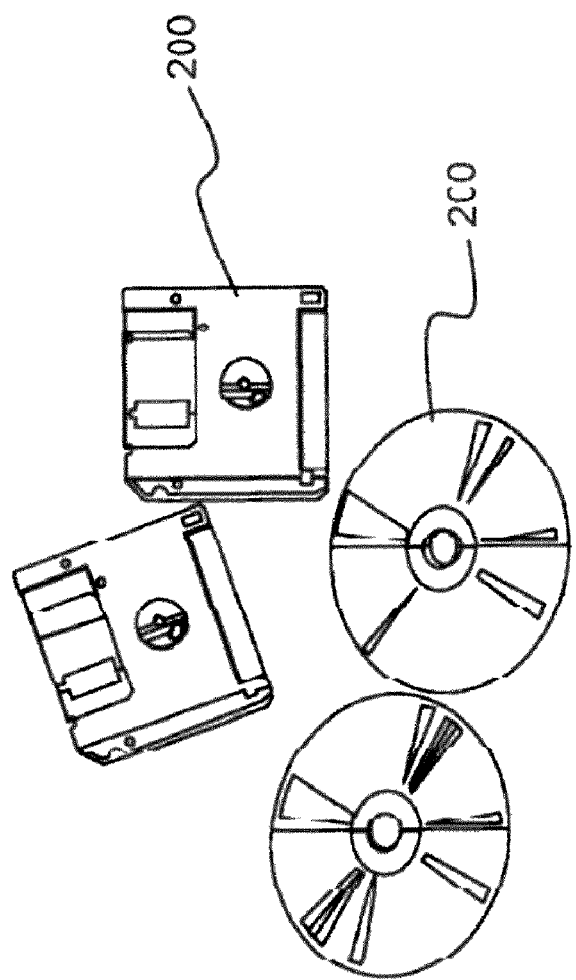
FIG. 2 is an illustration of a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instructions stored on any compatible computer-readable medium.

(3) Introduction

The present invention is a video generation system that allows a user to be inserted into a favorite video, thereby allowing the user to increase creativity by acting along with a character and creating a customized video. The system also allows a user to selectively remove a particular character from a show (e.g., cartoon series) and act along with the remaining characters to generate a combined customized video that includes the user and the remaining cast of characters.

(4) Details of the Invention

Figure 3:
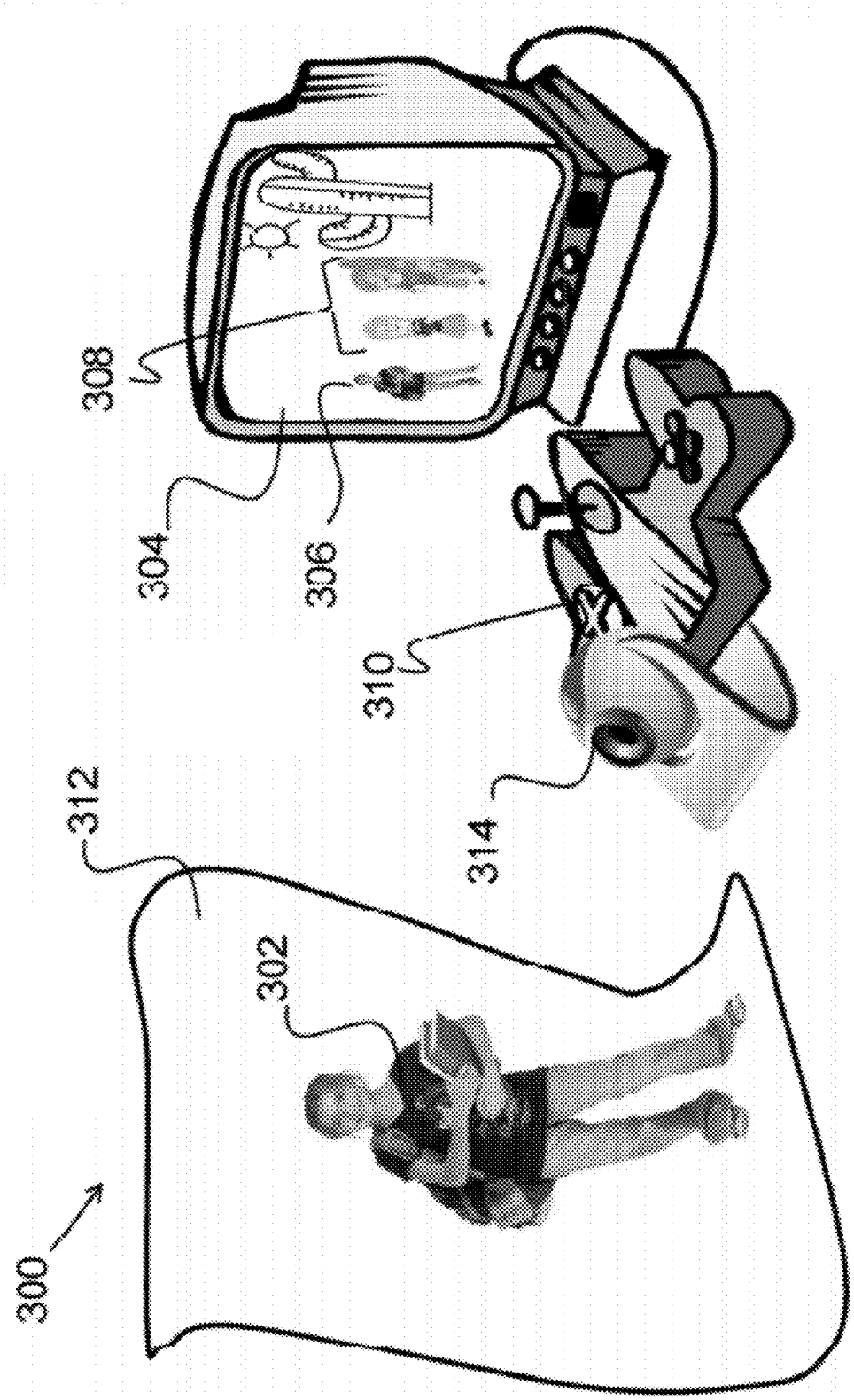
FIG. 3 is an illustration of a video generation system according to the present invention.

As noted above and as illustrated in FIG. 3, the present invention is a video generation system 300 that allows a user 302 to create a customized video 304 that includes an image of the user 306. The customized video 304 can include an image of the user 306 alone or an image of the user 306 along with a character or cast of characters 308.

In order to operate, the video generation system 300 includes a console 310, a screen 312, and a sensor 314 (e.g., video camera). The console 310 includes a data processing system that is configured to receive images from the sensor 314 (e.g., of a user in a foreground) and fuse the images with a prerecorded video image (e.g., in a desired background) to create the customized video 304. The console 310 uses any suitable technique or method for fusing a live foreground with the desired background, a non-limiting example of which includes Chroma Key. In other words, the console 310 includes Chroma. Key software that allows a user to be filmed by the sensor 314 and merged into the desired prerecorded video, a non-limiting example of such a system includes Photokey software by FX Home Limited. As another non-limiting example, edge feature detection and object detection systems can be used to extract the user from a video sequence for merging with the prerecorded video.

In order to using the Chroma Key software, the screen 312 is any suitable background that provides for the operation of color keying, non-limiting examples of which include a green screen and a blue screen. In other words, the user 302 can stand in front of the screen 312 and record a video image of the user 306 that can be overlayed the original prerecorded video to create the customized video 304.

Chroma key technology has long been known in the art. However, the present invention expands upon the prior art by allowing the user to selectively remove a character from the prerecorded video and insert themselves in the video along with the remaining cast of characters. In other words, a user can selectively remove one or many characters from a video and insert themselves into the action.

Figure 4:
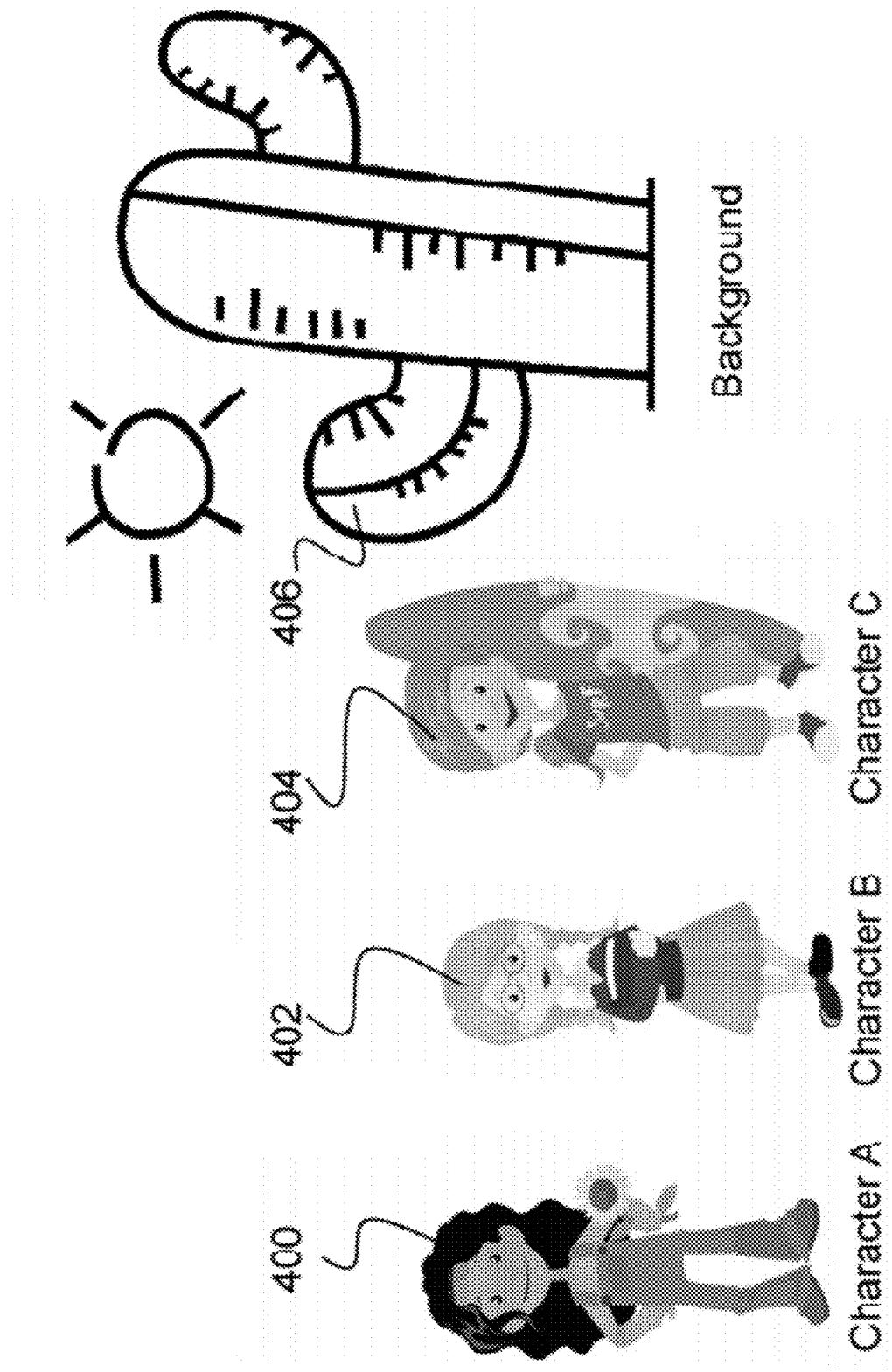
FIG. 4 is an illustration of a screen short illustrating several characters.
Figure 5:
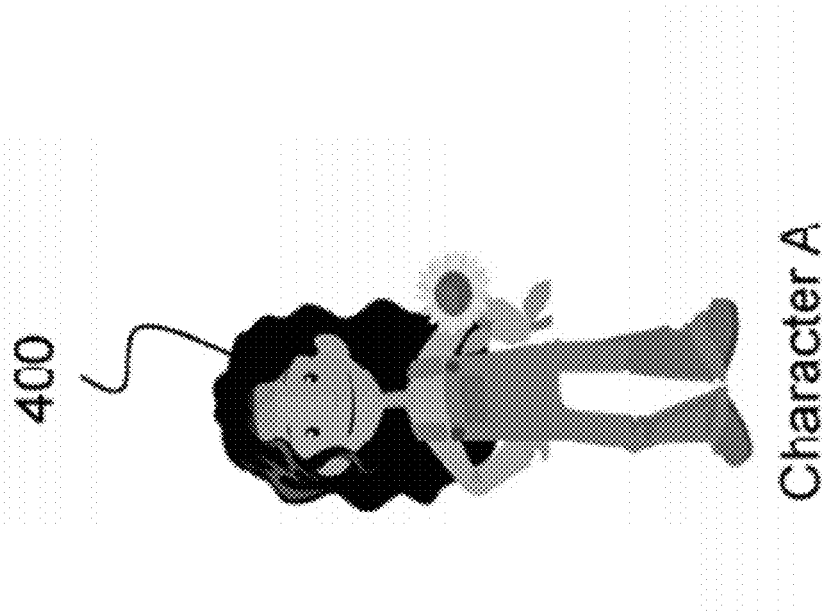
FIG. 5 is an illustration of a screen short illustrating a layer with Character A.
Figure 6:
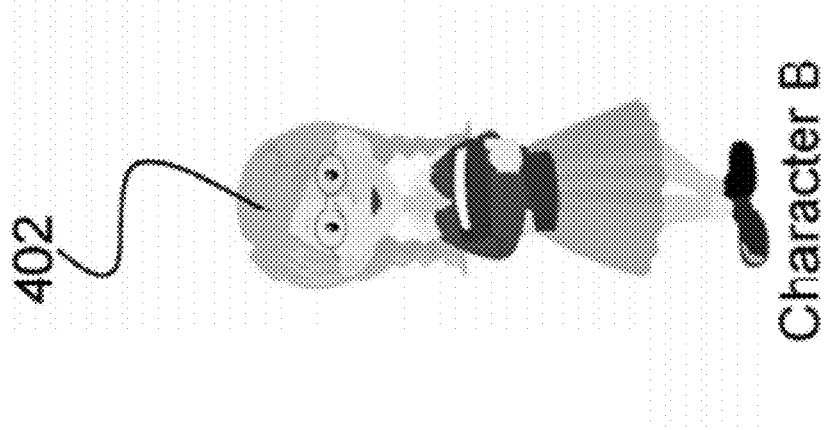
FIG. 6 is an illustration of a screen short illustrating a layer with Character B.
Figure 7:
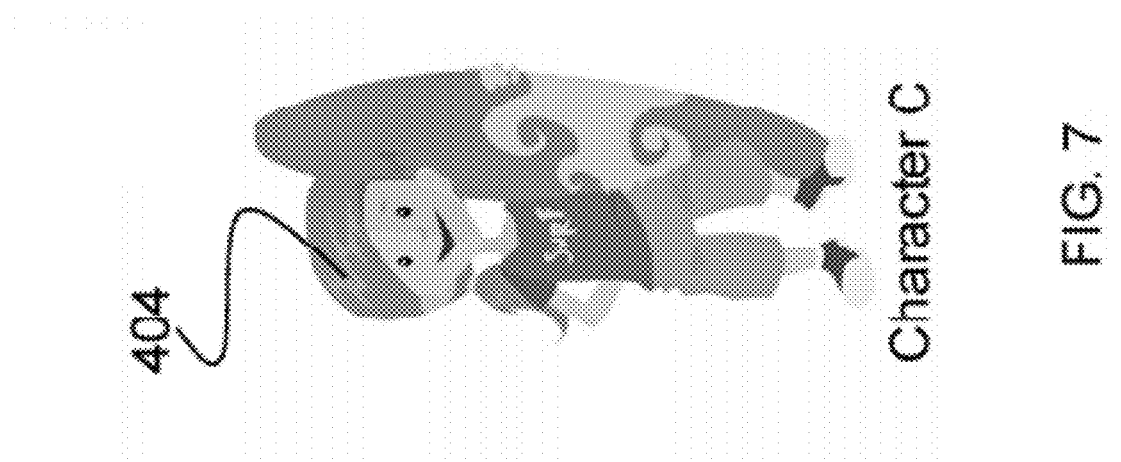
FIG. 7 is an illustration of a screen short illustrating a layer with Character C.
Figure 8:
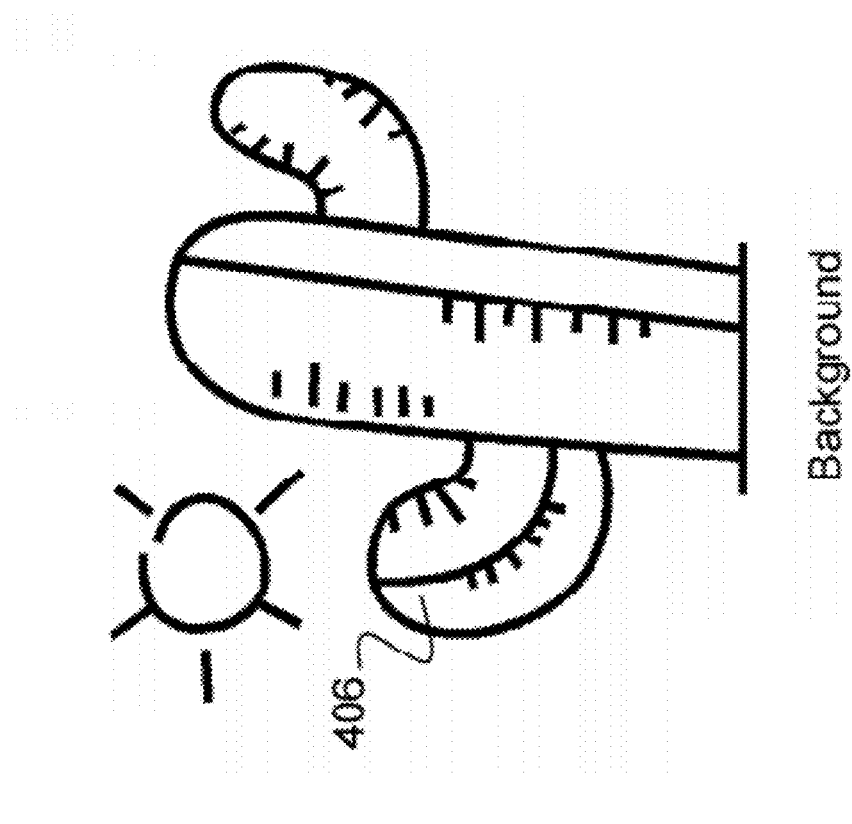
FIG. 8 is an illustration of a screen short illustrating a layer with a background item.

As depicted in FIG. 4, a prerecorded video can include one or any number of characters (e.g., Character A 400, Character B 402, and Character C 404) that are displayed along with a background 406. The video generation system is formed to allow a user to selectively remove one of the characters. The system uses any suitable technique for allowing a user to selectively remove a character, a non-limiting example of which includes layers or overlays. For example, each of Character A 400, Character B 402, Character C 404, and the background 406 are formed of different overlays. FIG. 4, for example, depicts each of the overlays merged together to form a single image. Alternatively, FIG. 5 depicts an overlay that includes only Character A 400, FIG. 6 depicts an overlay that includes only Character B 402, FIG. 7 depicts an overlay that includes only Character C 404, and FIG. 8 depicts an overlay that includes only the background 406. As can be appreciated by one skilled in the art, using the overlays, the system can be configured to allow a user to selectively remove any one of the cast of characters. For example, if the video was a cartoon featuring John the explorer and his friend Jane, then a user may decide to remove Jane from the scene and insert them self into the video to play along with John.

Figure 9:
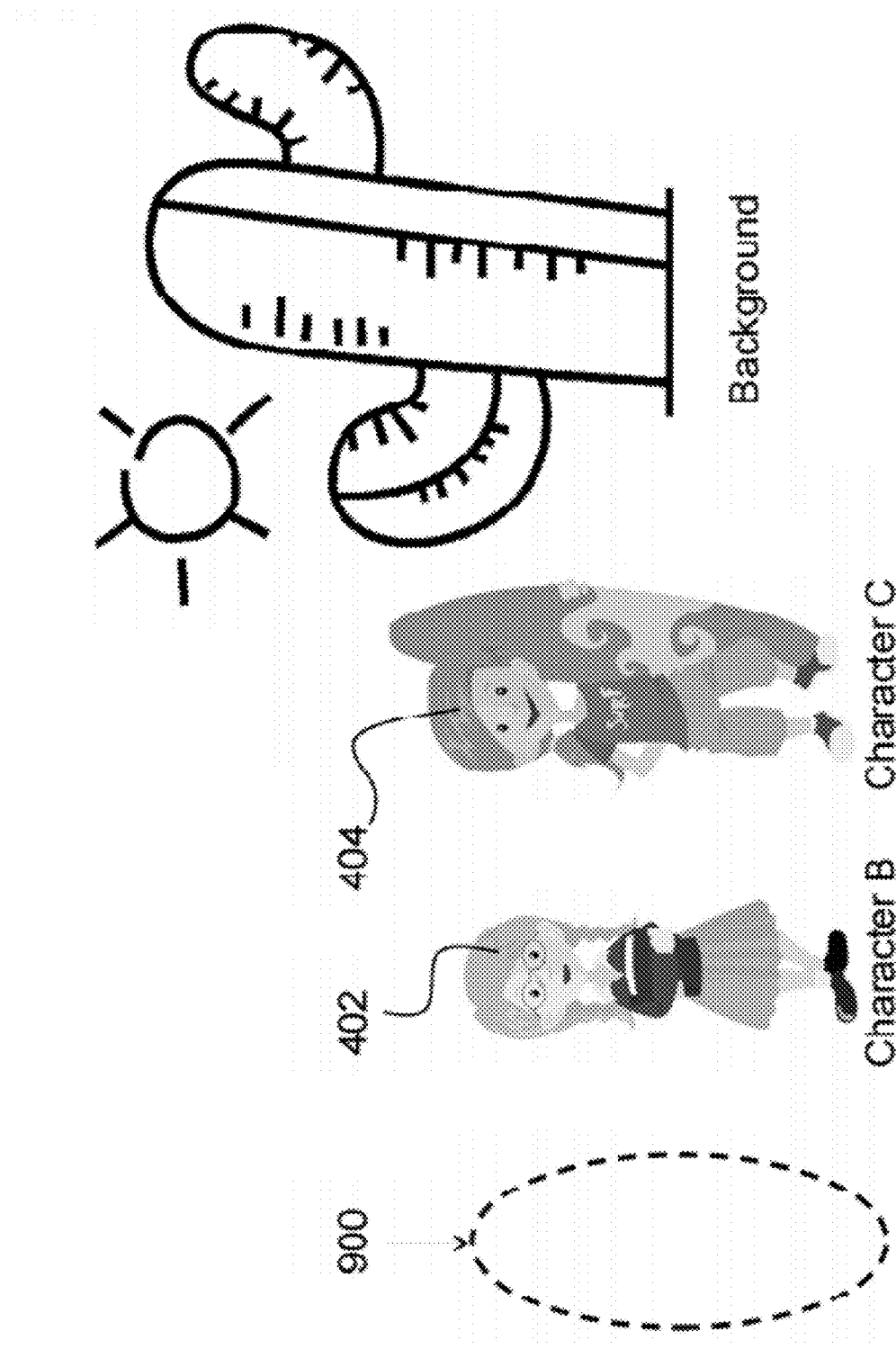
FIG. 9 is an illustration of a screen short illustrating several characters with the layer having Character A removed.
Figure 10:
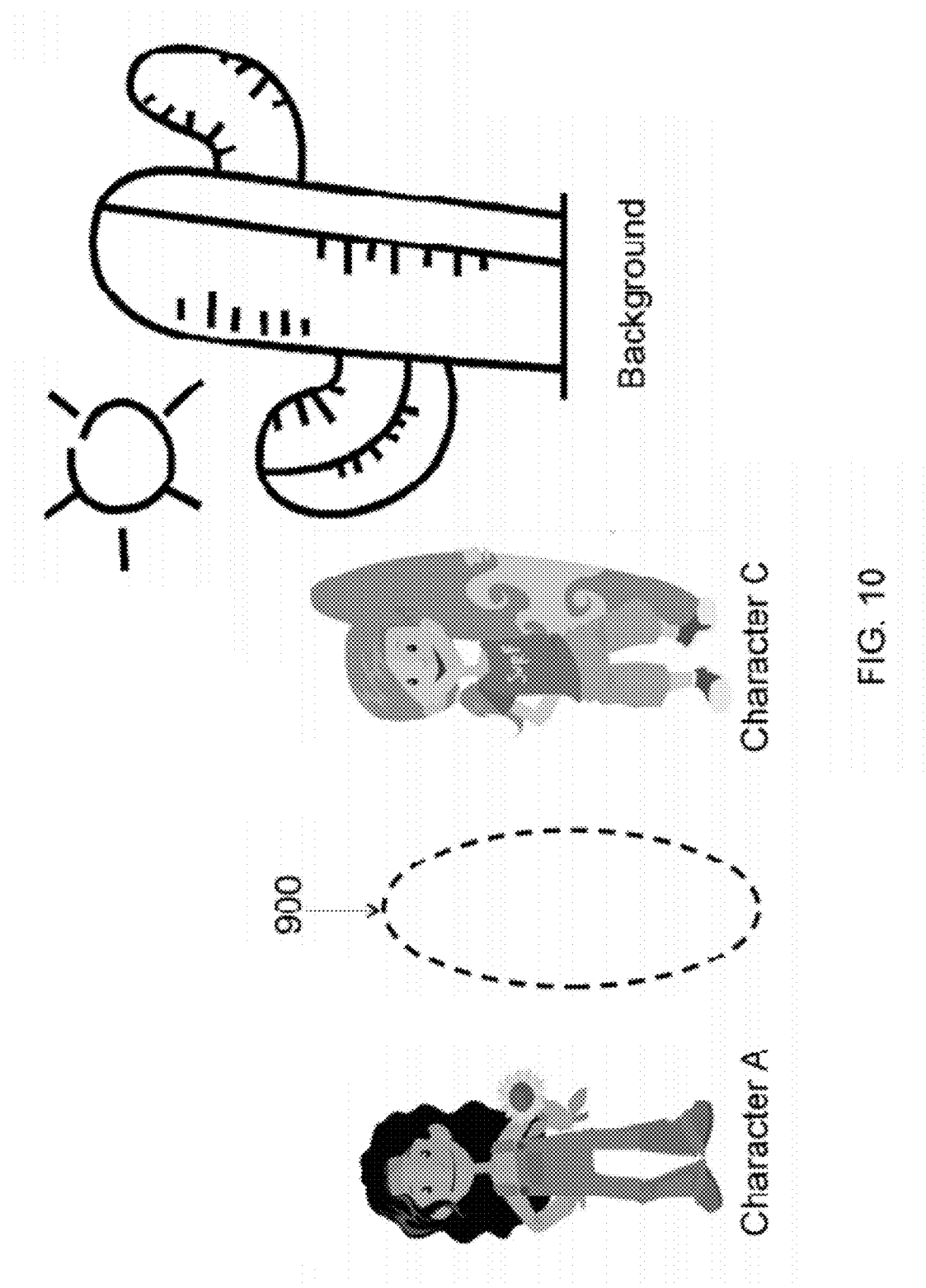
FIG. 10 is an illustration of a screen short illustrating several characters with the layer having Character B removed.
Figure 11:
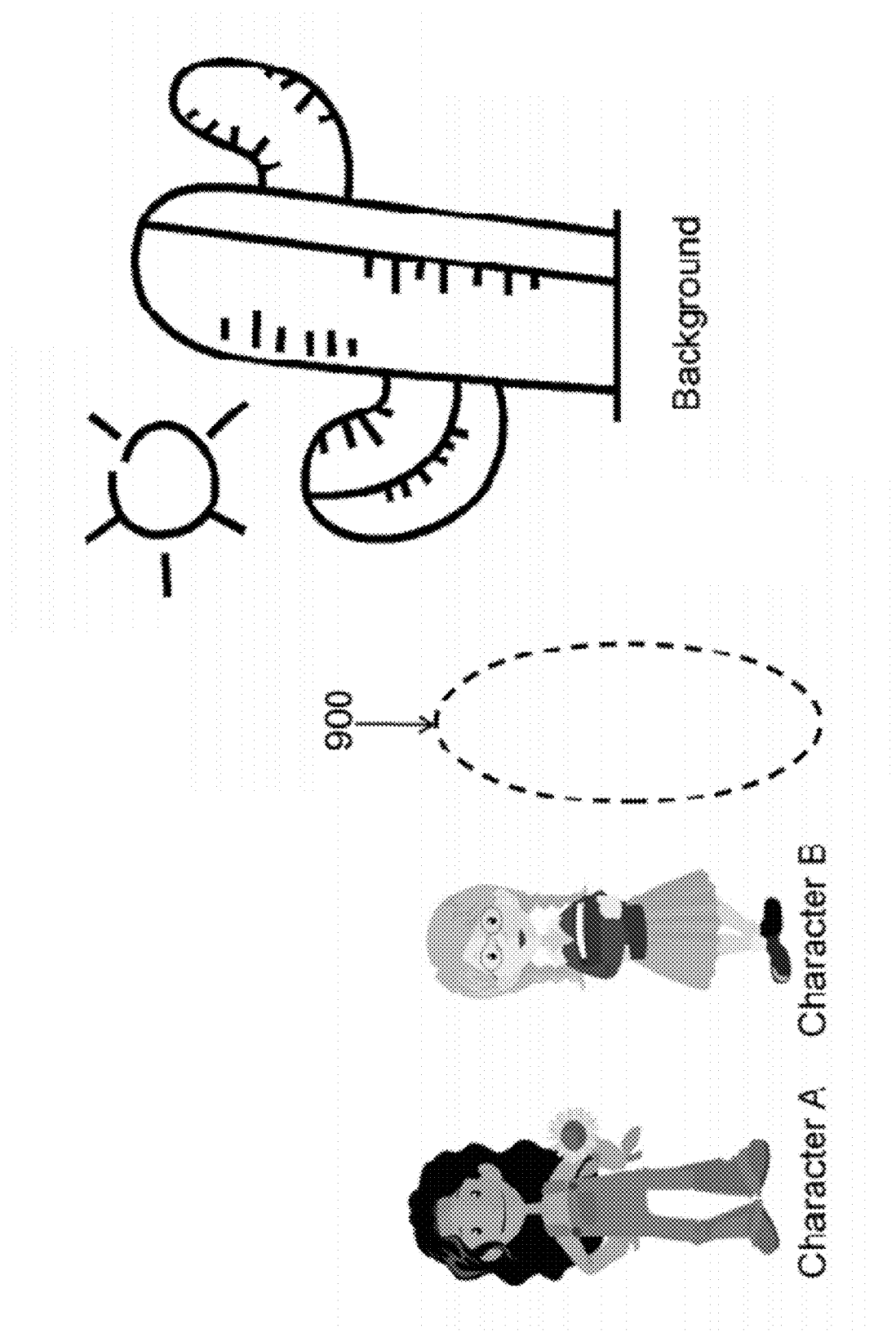
FIG. 11 is an illustration of a screen short illustrating several characters with the layer having Character C removed.

For further illustration, FIGS. 9 through 11 each depict a single character removed from the video, with the remaining cast of characters. In removing the character, it creates void in the video image that provides for placement of the user. For example and as illustrated in FIG. 9, Character A has been removed from the scene, leaving Character B 402 and Character C 404. A void 900 now exists where Character A was once positioned. Again, as depicted in FIGS. 10 through 11, a user can selectively remove any one of the cast of characters to insert themselves in the void 900 where the removed character once was.

Figure 12:
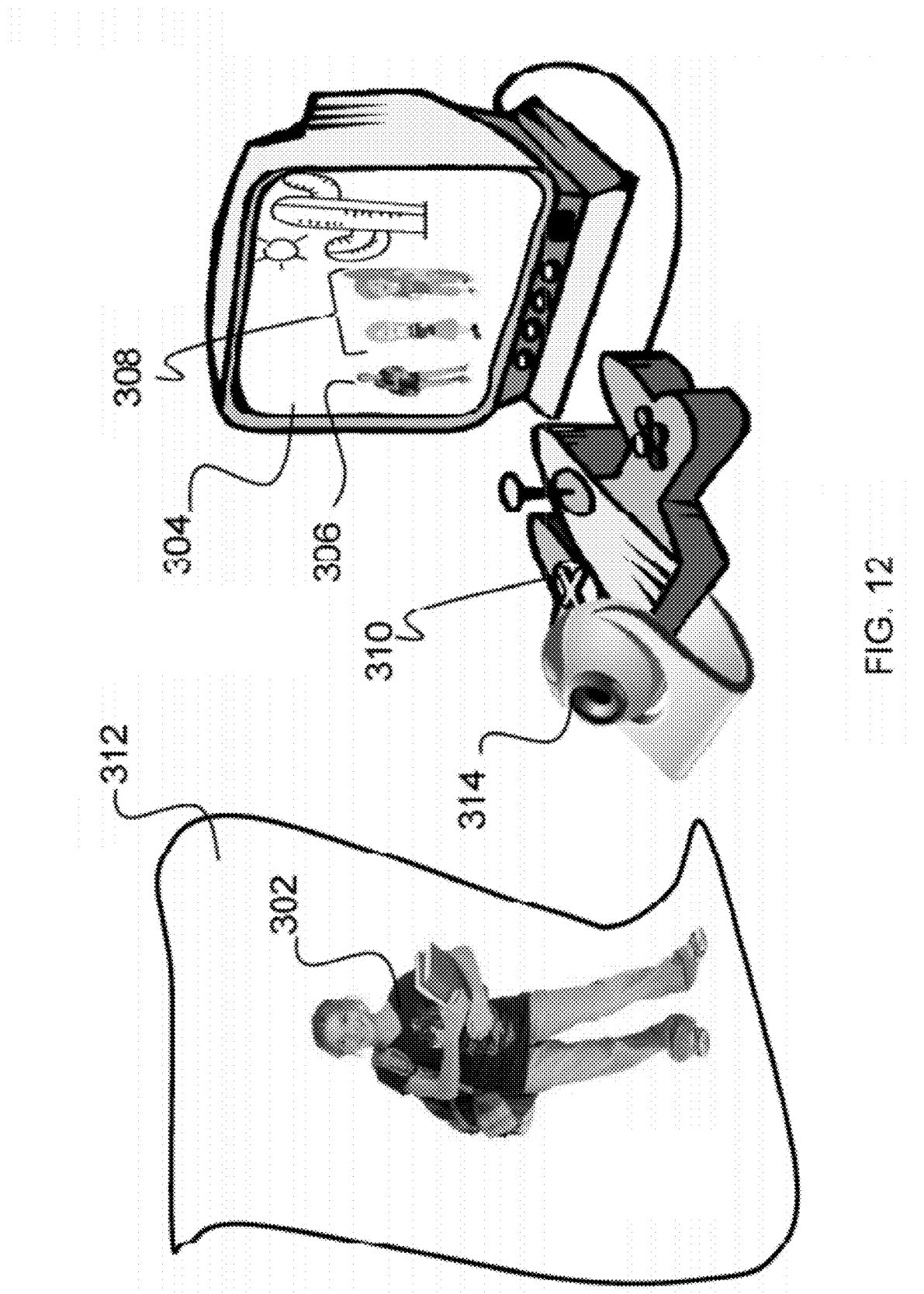
FIG. 12 is an illustration of a video generation system according to the present invention.

Thus, as depicted in FIG. 12, the user 302 can now position themselves in front of the screen 312 and sensor 314 (i.e., video camera) so that they occupy the void. The console 310 then merges the image of the user 306 with the remaining cast of characters 308 to create the customized video 304.

Figure 13:
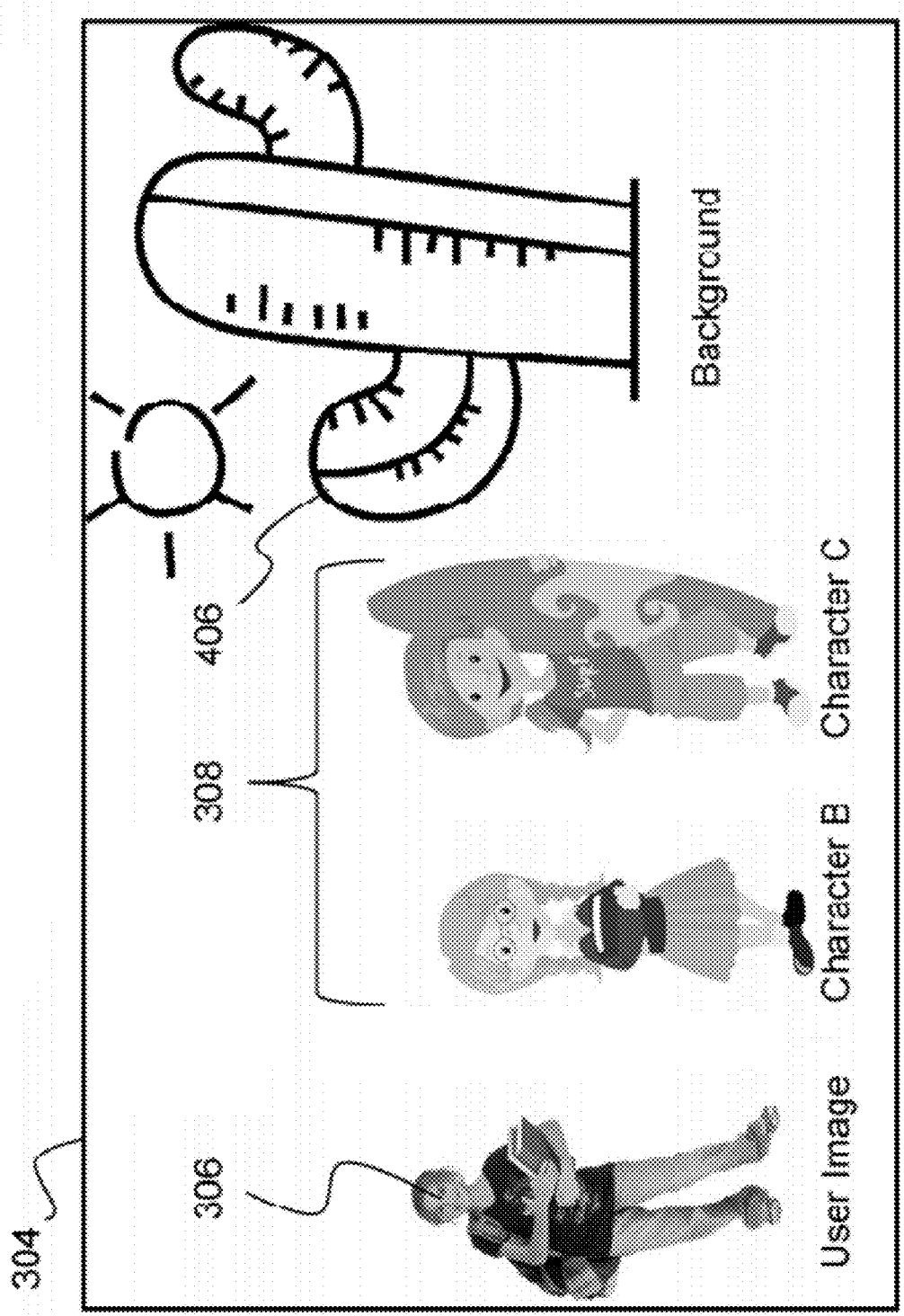
FIG. 13 is an illustration of a screen shot depicting a user inserted into a video in place of Character A.

FIG. 13 is another illustration of the customized video 304 that depicts the user 306 with the remaining cast of characters 308 and the desired background 406.

Figure 14:
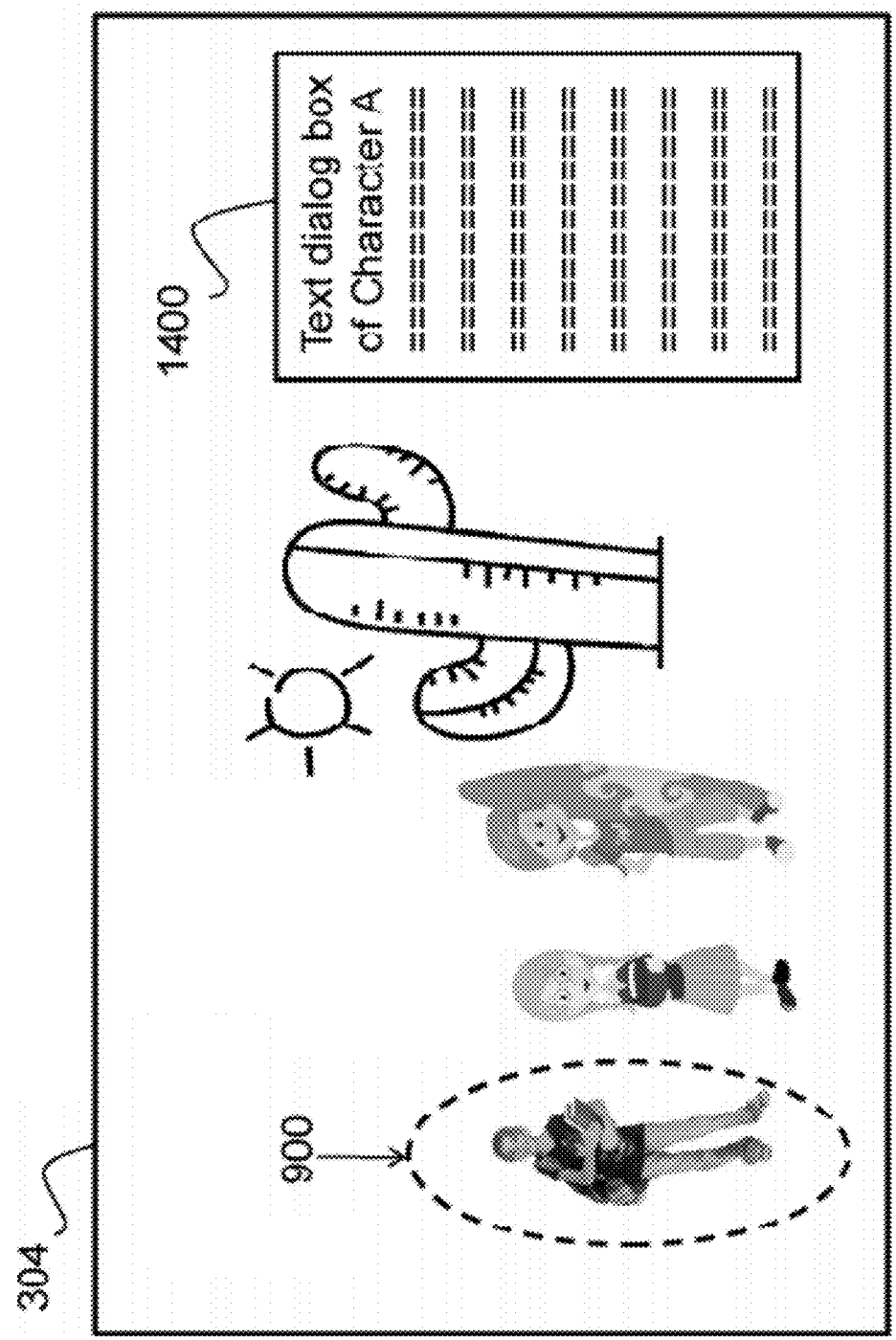
FIG. 14 is an illustration of a screen shot depicting a the user inserted into a video in place of Character A, where the screen shot also include the text of Character A.

As can be appreciated by one skilled in the art, the present invention allows a user to insert them self into a video and act along with their favorite character(s). In some cases, the prerecorded video may already possess a certain script and audio track. The audio track can also be layered such that removing a video image of a particular character also removes the associated audio track with that character. For example, if Character A is removed, the audio track for Character B and Character C will continue to play along with video while the audio track for Character A no longer plays. Thus, when the user inserts them self into the scene, they may want to generate their own audio to play along with the newly recorded video image. In doing so, the system includes a microphone that records the user's audio. In cases where the video includes a script, the user may decide to follow the script of the removed character. For example and as depicted in FIG. 14, a text dialog box 1400 can be included on a display that includes the text of the removed audio. For example, if the user selected to remove Character A, the user would then use the system to position themselves in the customized video 304 in the void 900 where Character A was once positioned. Additionally, in a record mode, the text dialog box 1400 would illustrate the text of Character A's script, which allows the user to read the script and record an audio track that coincides with the video.

It should be noted that the text dialog box 1400 can be selectively removed and added. Desirably, it would be included during a record mode and removed during a playback mode. The record mode can be configured so that it includes all of the characters in the cast of characters, so that it is missing a single character, or so that it is selectively missing any number of characters from the cast of characters. Thus, using the present invention, a user can selectively remove a character from a prerecorded video and insert themselves in place of the removed character. The user can effectively act the part of the removed character to generate a customized video. The user can also act along with a friend, where the user removes at least two characters from the cast of characters (creating at least two voids). Additionally, when a plurality of characters are removed from the video, a plurality of corresponding text dialog boxes can be displayed (e.g., during the record mode) to allow a plurality of users to act along and follow a predetermined script.

As can be appreciated by one skilled in the art, dialogue between a cast of characters often results in individual characters being called by their name. Thus, it is desirable to enable the system to call the user by the user's actual name. In other words, the system is configured to allow the other characters (other than the user) to actually verbalize the user's name in the course of the audio dialogue (in the audio track). This can be accomplished by through several techniques. For example, the system can have a preconfigured list of names. In this aspect, a user can create a profile and select his/her own name from the list. Alternatively, the user's name can be input through a standard alphabetic keyboard, either externally or internally (similar to a standard video game console) through the use of the display and a selection device. Once the name is selected, it is generated audibly by the system at the appropriate portions of the dialogue. As yet another aspect, the user can actually use a microphone to record their own name which is thereafter generated audibly at the appropriate portions of the dialogue.

It should be noted that the prerecorded video is any video that includes at least one character, non-limiting examples of which include cartoons, sitcoms, etc. Additionally, the video generation system may include a port or input for receiving a plurality of prerecorded videos. For example, the console may include a slot for a cartridge, where each cartridge includes a particular episode of a cartoon (or any other media). Thus, using multiple cartridges, the user can selectively insert them self (and their friends) into the desired episode.

In another aspect, it may be desirable to record a single chapter at a time, or several chapters at a time. For example, the video (e.g., episode) can be formed in a plurality of chapters. Thus, a user can record and insert them self into a chapter of the episode and save that chapter for later viewing. Thereafter, the user can record another chapter and again, save the next chapter for later viewing. The chapters can be viewed consecutively or selectively viewed one at a time. By breaking down the recordings into chapters, the user can practice and keep only those portions of the episode that are most desired by the user.

It should also be noted that the video camera, microphone, and console can be formed as a single unit or as separate units that are connected with one another.

In another aspect, when a particular character is removed to allow a user to act the removed character's part, the removed character can be depicted as a ghost or shadow character (or as a remaining outline of the character). For example, if a user would like to act out the scene for Character A, then the full image of Character A is removed. However, a shadow or translucent image of Character A can be displayed to provide an acting visual for the user. In other words, Character A's motions are still partially displayed to allow the user to mimic Character A's motions while filming. Alternatively, the outline of the removed character can remain to provide the user with a outline of the body form of the removed character as the acting visual.

What is claimed is:

1. A computer implemented method for allowing a user to be filmed and merged into a premade video sequence for display upon a display system, comprising an act of causing a processor to execute instructions encoded upon a memory, such that upon execution of the instructions, the processor performs operations of:
   receiving a video having a plurality of characters, each character having a corresponding audio track;
   allowing a user to remove at least one of the plurality of character and corresponding audio track from the video, leaving remaining characters and remaining audio track;
   displaying a translucent image of a removed character while playing the video with remaining characters and remaining audio track on the display system;
   receiving a user video image and a corresponding user audio track of a user;
   displaying the user video image and user audio track along with the video with the remaining characters and the remaining audio track.

2. The method as set forth in claim 1, further comprising an act of causing a processor to perform an operation of playing the video with the remaining characters and remaining audio track on a display system while receiving the user video and corresponding user audio track.

3. The method as set forth in claim 2, further comprising an act of causing a processor to perform an operation of recording the user video image and user audio track as it is received while the video with remaining characters and corresponding audio track is played on a display system.

4. A video generation system for allowing a user to be filmed and merged into a premade video sequence for display upon a display system, the video generation system comprising one or more processors, the one or more processors operable for performing operations of:
   receiving a video having a plurality of characters, each character having a corresponding audio track;
   allowing a user to remove at least one of the plurality of character and corresponding audio track from the video, leaving remaining characters and remaining audio track;
   displaying a translucent image of a removed character while playing the video with remaining characters and remaining audio track on the display system;
   receiving a user video image and a corresponding user audio track of a user;
   displaying the user video image and user audio track along with the video with the remaining characters and the remaining audio track.

5. The video generation system as set forth in claim 4, wherein the one or more processors is further configured to perform an operation of playing the video with the remaining characters and remaining audio track on a display system while receiving the user video and corresponding user audio track.

6. The video generation system as set forth in claim 5, wherein the one or more processors is further configured to perform an operation of recording the user video image and user audio track as it is received while the video with remaining characters and corresponding audio track is played on a display system.

7. A computer program product for allowing a user to be filmed and merged into a premade video sequence for display upon a display system, the computer program product comprising computer-readable instruction means stored on a non-transitory computer-readable medium that are executable by a computer for causing the computer to perform operations of:
   receiving a video having a plurality of characters, each character having a corresponding audio track;
   allowing a user to remove at least one of the plurality of character and corresponding audio track from the video, leaving remaining characters and remaining audio track;
   displaying a translucent image of a removed character while playing the video with remaining characters and remaining audio track on the display system;
   receiving a user video image and a corresponding user audio track of a user;
   displaying the user video image and user audio track along with the video with the remaining characters and the remaining audio track.

8. The computer program product as set forth in claim 7, further comprising instruction means for causing the processor to perform an operation of playing the video with the remaining characters and remaining audio track on a display system while receiving the user video and corresponding user audio track.

9. The computer program product as set forth in claim 8, further comprising instruction means for causing the processor to perform an operation of recording the user video image and user audio track as it is received while the video with remaining characters and corresponding audio track is played on a display system.

* * * * *